Nov. 6, 1951  A. M. GRASS  2,573,840
RATE MEASURING AND COMPARING CIRCUIT
Filed Oct. 10, 1945  2 SHEETS—SHEET 1

INVENTOR
ALBERT M. GRASS
BY
Ralph L. Chappell
ATTORNEY.

Nov. 6, 1951 A. M. GRASS 2,573,840
RATE MEASURING AND COMPARING CIRCUIT
Filed Oct. 10, 1945 2 SHEETS—SHEET 2

INVENTOR
ALBERT M. GRASS
BY
Ralph L. Chappell
ATTORNEY

Patented Nov. 6, 1951

2,573,840

UNITED STATES PATENT OFFICE 2,573,840

RATE MEASURING AND COMPARING CIRCUIT

Albert M. Grass, Quincy, Mass., assignor, by mesne assignments, to the United States of America as represented by the Secretary of the Navy Application October 10, 1945, Serial No. 621,576

14 Claims. (Cl. 318—28)

This invention relates to measurement systems, more particularly automatic tracking systems, and especially such systems employed with pulse echo radio apparatus.

The primary object of the invention is to generally improve measurement systems of the character specified.

A more particular object is to provide a measurement system suitable for automatic tracking of range, although the system is also useable for automatic tracking of angle.

Another object of the invention is to devise such a system including means for slewing the controls under motor drive at any desired rate.

Still another object of the invention is to provide means for not only measuring the desired quantity (for example, range), but also for measuring the rate of change of the measurement (range rate).

Still another object of the invention is to provide means for so-called "aided tracking," that is, tracking in which the movement is mainly under motor drive, but modified when desired by manual control. In accordance with the present invention the last known rate is maintained during aided tracking except when a correction is cranked in, and in that case the correction is applied not only to the measurement, but also to the rate measurement, thereby establishing a new rate. Thus the system provides not only "velocity memory," but also a ready change of the remembered velocity.

Still another object of the invention is to provide motion for two output shafts; one for the measurement, and the other for the measurement rate, said output shafts being suitable for connection to a standard computer for fire control of weapons.

To accomplish the foregoing general objects, and other more specific objects which will hereinafter appear, my invention resides in the circuit elements and their relation one to the other as are hereinafter more particularly described in the specification. The specification is accompanied by drawings in which:

Fig. 1A is a schematic representation of four switches forming a part of the apparatus shown in Fig. 1;

Figure 1:
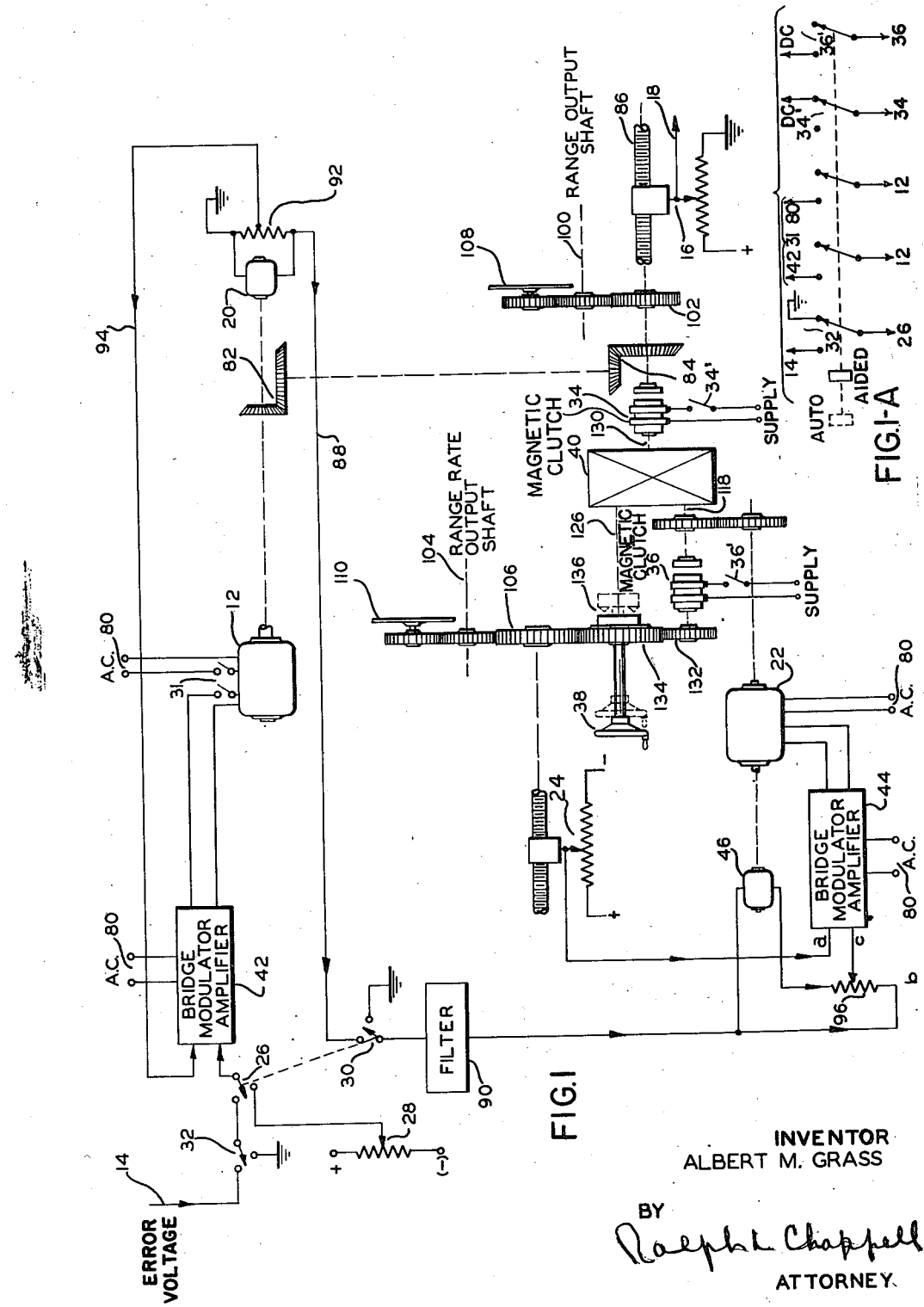
Fig. 1 is a schematic diagram of one form of apparatus embodying the invention.

Referring now to the drawing, and more particularly to Fig. 1, the apparatus in brief summary comprises a reversible motor 12 responsive to a position error voltage supplied at 14. The motor 12 drives a measurement potentiometer 16, which varies a measurement potential at lead 18, in that direction which will reduce the error voltage at 14 to zero, thus bringing the motor 12 to rest. Motor 12 also drives an electrical generator 20 which generates a potential which is linearly proportional to the rate of change of the measurement. The measurement-rate potential from generator 20 is supplied to a second reversible motor 22, which motor in turn drives a measurement-rate potentiometer 24. The potential from potentiometer 24 is employed in opposition to the potential from generator 20, thus bringing the motor 22 and the potentiometer 24 to a position proportional to the rate of change of the measurement.

The specific apparatus here disclosed has been designed for range tracking in connection with radio pulse echo (radar) systems. It is equally applicable to angle tracking, and to the tracking of other variable measurements, but for convenience the description will be in terms of range tracking. The apparatus is intended not only for "automatic tracking," but also includes "slewing" means, and "aided tracking" means. It will be seen that if switch 26 is changed from its upper position to its lower position, the error voltage from source 14 will be replaced by a substitute voltage from a slew potentiometer 28. This will cause the motor 12 to work continuously at a constant speed, the speed being determined by adjustment of the slew potentiometer 28. At the same time a switch 30 may be moved from its upper to its lower position, thereby grounding the range rate circuit, for a range rate indication anyway would be without significance during slewing.

For aided tracking a switch 32 is moved from its upper to its lower position, thereby removing the source of error voltage and making the motor 12 wholly inoperative. At the same time a magnetic clutch 34, which was previously released, is now energized through switch 34', thereby connecting the motor 22 instead of the motor 12 to the range potentiometer 16. Also another magnetic clutch 36, which previously was energized through switch 36', is now de-energized, thereby disconnecting the motor 22 from the range rate potentiometer 24. Now motor 22 will turn at a speed dependent upon the last adjusted position of the range rate potentiometer 24, so that the range potentiometer 16 will continue to be moved at the last speed at which it was moved before the change from automatic tracking to aided tracking was made. In other words the system remembers and maintains the last speed, a feature sometimes called "velocity memory" or "coasting." The operator, however, may feed in any correction needed to accurately follow the target, this being done by means of a control handle 38. The motor 22 and control handle 38 both feed into a differential gear system 40 such that either one may turn the magnetic clutch 34, and through it the range potentiometer 16, thus causing the range reading to be speeded or slowed in order to follow the target. At the same time the correction fed in by manual control 38 also readjusts the range rate potentiometer 24, and thereby readjusts the speed of the motor 22, so that the coasting speed maintained when the manual correction is discontinued is the last adjusted speed of the system.

Before concluding the foregoing general description of the invention, it may be mentioned that each of the motors 12 and 22 is preferably energized through an amplifier 42 and 44 respectively, and that these amplifiers are subjected to degenerative feed back for damping and stabilizing the operation of the motors. More specifically some of the output of generator 20 is degeneratively fed back to amplifier 42, the damping being proportional to the range rate. If the amplification factor in amplifier 42 is large, the degenerative feed back may be made such as to insure linear relationship between the speed of the motor 12 and the magnitude of the error voltage supplied at 14. Furthermore, the other motor 22 is provided with a generator 46 the output of which is degeneratively connected into the circuit leading into amplifier 44, thereby stabilizing the motor 22, and obtaining a speed proportional to range rate. The generators 20 and 46 should, of course, have a linear voltage characteristic, which may be obtained by using a constant field. In practice, a permanent magnetic field is preferable, and the generators used are preferably of the so-called "D. C. tachometer" type commonly used to operate a voltmeter calibrated in terms of speed.

Figure 2:
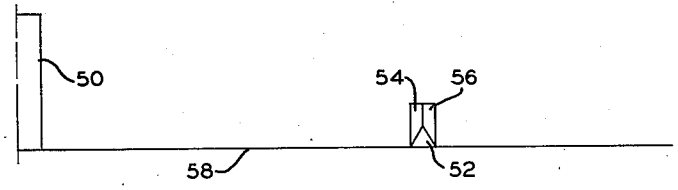
Fig. 2 represents in idealized fashion the display on an "A" type scope, and is explanatory of the invention.

The error voltage supplied at lead 14 may be obtained in any known manner. The usual method of obtaining the error voltage is that suggested in Fig. 2, in which the main bang or transmission pulse is indicated at 50, while the echo to be tracked is indicated by the triangular pip at 52. A pair of immediately adjacent rectangular pulses or narrow gates 54 and 56 are generated, and may be moved along the axis 58 on the oscilloscope screen. The echo 52 and gate 54 are fed to one coincidence circuit, and the echo 52 and gate 56 are fed to another coincidence circuit. It will be evident that if the echo moves to one side or the other the output of one of the coincidence circuits will be diminished or cut off, while that of the other coincidence circuit will be increased. By combining the outputs of the coincidence circuits in opposition (differentially), a voltage may be obtained which will have a magnitude and sign proportional to the error.

Figure 3:
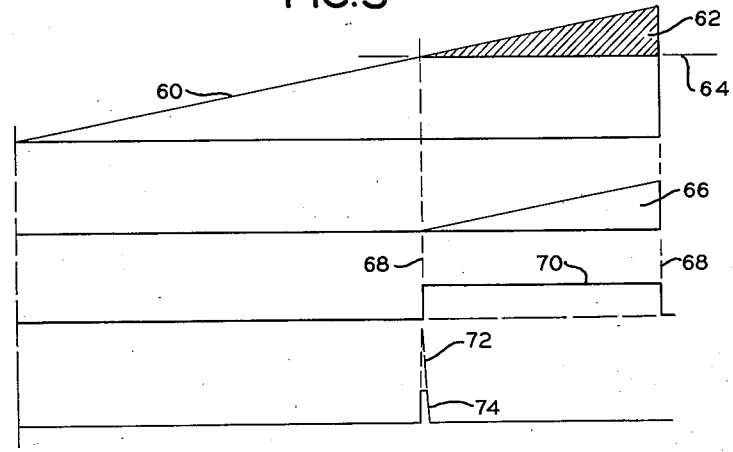
Fig. 3 shows a series of related voltage-time curves explanatory of the invention.

Reverting to Fig. 1, it will be recalled that the error voltage causes motor 12 to shift range potentiometer 16 so that a new range potential will be supplied at 18. The manner in which this changes the position of the gates to again straddle the echo pip 52 in Fig. 2 may be explained with reference to Fig. 3. In that figure a linear saw tooth wave 60 is developed having a length equal to the sweep on the oscilloscope. By feeding it through a diode having its cathode biased positively by the amount of the range potential, the lower half of the saw tooth wave 60 will be wasted, and only the portion 62 above the range potential level 64 will be effective, thereby producing a saw tooth wave shown at 66. This may be very greatly amplified, as indicated at 68, and limited to produce a rectangular wave 70. By differentiating the rectangular wave 70 a sharp pulse 72 is obtained, which may be cut off to provide the desired rectangular pulse or narrow gate 74. It will be noted that the side-to-side position of the gate 74 varies in linear relationship to the amplitude of the range potential level 64. The immediately adjacent gate is obtained by a slight delay, and both gates are moved to one side or the other in unison as the range potential varies.

Referring now to Fig. 1, and considering the same in greater detail, the motor 12 in the specific case here illustrated is a two-phase induction motor. One field coil is supplied with a fixed reference voltage from a standard A. C. source 80, and the other field coil is supplied from amplifier 42. Amplifier 42 is preferably of the bridge modulator type disclosed and claimed in my copending application, Serial No. 596,725 filed May 30, 1945, now abandoned, but it may be any of a number of known circuits which will control or modulate an alternating current in proportion to a direct voltage, and which will reverse the phase of the alternating current 180° when the control voltage is changed in sign from plus to minus or vice versa. A bridge modulator type of amplifier as disclosed in said copending application generally comprises a pair of diode electron tubes and a pair of load resistors serially connected between the terminals of the secondary of a transformer. One of said load resistors is connected between one of said secondary terminals and the anode of one of said electron tubes, the second load resistor connects the cathode of that electron tube to the anode of the second electron tube, the cathode of this second electron tube being returned to the second secondary terminal. The center point of the secondary winding is, in effect, capacitively coupled to ground. This may conveniently be accomplished by connecting the capacitor to the center tap of a resistor connected between the two secondary terminals. This connection may be made adjustable in position to provide means for balancing the modulator circuit. One side of the D. C. control voltage input is coupled directly to the center point of this last-mentioned resistor while the other side of the control voltage input is coupled to the cathode of the first diode electron tube through a suitable resistor. The output signal is taken from the modulator through a resistor capacitor coupling circuit coupled to the cathode of the first diode and to ground. In the present case alternating current is supplied from a standard source 80, and is phase shifted 90°, and is then subject to a phase shift of either 0° or 180° depending on the sign of the error voltage supplied at 14. The alternating current output from amplifier 42 is supplied to the other field of motor 12, and the motor will run in one direction or the other depending on the phase of the alternating current.

The drive from motor 12 to the range potentiometer 16 is schematically indicated by bevel gearing 82 and 84 and screw 86.

The generator 20 is a permanent magnet field D. C. tachometer the output of which is supplied thru lead 88, switch 30, and a filter 90, to the amplifier 44. The output of D. C. tachometer 20 is also applied across a voltage divider 92, so that a desired fraction of the voltage may be led through wire 94 back to amplifier 42. The degenerative feed back system is considered important not only to stabilize the system and avoid hunting, but also because it permits the operation of motor 12 to be made substantially linear.

The amplifier 44 is also preferably a bridge modulator amplifier of the type disclosed in my aforesaid co-pending application, Serial No. 596,725, and is supplied with alternating current from a standard source 80. The phase of this alternating current is shifted 90°, and its amplitude is controlled by the D. C. potential supplied across leads "a" and "c." The phase of the alternating current is shifted from 0° to 180° upon reversal in sign of the D. C. potential across leads "a" and "c."

The motor 22 is a two-phase induction motor. One field coil is supplied from the standard alternating current source 80, and the other field coil is energized by the output from amplifier 44.

It will be noted that the range rate potential is applied to point "b" at one end of a voltage divider 96 while the output of the permanent magnet field D. C. tachometer 46 is connected to the other end of the voltage divider 96. The voltage supplied to the amplifier at "a" depends on the adjustment of the range rate potentiometer 24, and is fed in opposition to the range rate potential supplied at point "b." When the potential at points "a" and "c" are equal, the motor 22 comes to rest, together with the tachometer 46 and the range rate potentiometer 24. The potential at "a" is then equal to the potential at "b," since there is no tachometer output potential, and this is the desired balance which would indicate that the range rate is constant.

Inasmuch as the apparatus is ordinarily used with a computer for gun fire control, a range output shaft 100 may be provided, geared to potentiometer 16 at 102 and a range rate output shaft 104 may be provided, geared to range rate potentiometer 24 at 106. A range dial 108 and a range rate dial 110 may also be geared to the other shafts, as is schematically indicated on the drawing.

Figure 4:
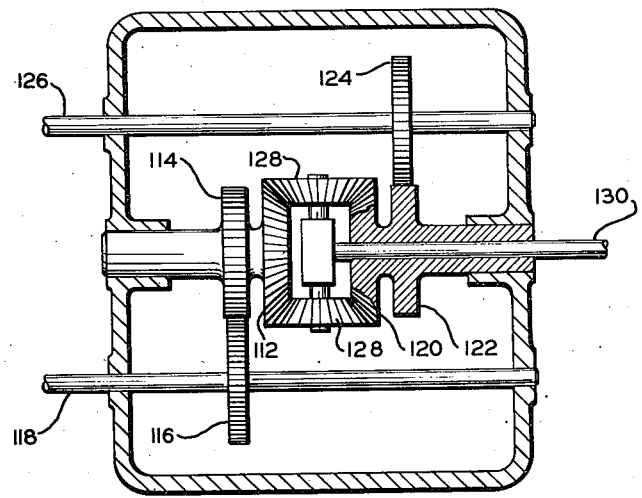
Fig. 4 is a simplified drawing of a differential gear forming a part of the apparatus shown in Fig. 1.

The nature of the differential gear indicated at 40 in Fig. 1 is better shown in Fig. 4. Bevel gear 112 is connected through spur gears 114 and 116 to shaft 118, while bevel gear 120 is connected thru spur gears 122 and 124 to shaft 126. One or more planet gears 128 are disposed on a spider connected to a shaft 130 passing concentrically through bevel gear 120 and spur gear 122. The shafts 118, 126 and 130 correspond to the similarly numbered shafts shown in Fig. 1. It will be evident that motion of either shaft 118 or 126 will be applied to shaft 130. Thus in the "aided tracking" position, motor 22 will turn shaft 130, and handle 38 will additionally control shaft 130. At this time any rotation of gear 132 by gear 134 is without significance because the magnetic clutch 36 is open.

However, during automatic tracking the magnetic clutch 34 is open, and any rotation of shaft 118 would cause rotation of shaft 126 if shaft 130 were locked. In lieu of this, however, a more direct drive takes place through gear 132 and 134 because at this time the magnetic clutch 36 is energized. The control handle 38 may at the same time be shifted inward to the dotted position shown, thereby disengaging a clutch 136 between the control handle and the gear 134, so that the handle need not spin during automatic tracking. It will be understood that the apparatus in Fig. 1 has been simplified for ease in understanding the same, and that in actual practice the switches 31 and 32, and the switches 34' and 36', respectively, for the power supply circuits for the magnetic clutches 34 and 36 may be interconnected as shown in Fig. 1A. Such an arrangement may be employed to switch from automatic to aided tracking. Alternatively, switches 26 and 30 and the axial movement of the control handle 38, may also be appropriately interconnected with the switches shown in Fig. 1A so that movement of a single master control may be used to change the apparatus to any one of the three operating conditions, that is, automatic tracking, slewing, and aided tracking.

During aided tracking the motor 12 and tachometer 20 are intentionally driven, by means of the gears 82 and 84, in order to avoid inertia or switching transients both mechanical and electrical which would arise when seeking to start such a mechanical system in motion from rest. This continuous mechanical drive makes it possible to switch directly from aided tracking to automatic tracking, even at high tracking rates. The output of tachometer 46 is greater than that of tachometer 20, gear ratios and other constants in the system being such that the effect of tachometer 46 is the primary control during aided tracking.

It may be well to summarize the different switch positions. Switch 32 is placed in the upper position for automatic tracking and for slewing, and is placed in the lower position for aided tracking. Switch 26 is placed in the upper position for automatic tracking and for aided tracking, and is placed in the lower position for slewing. Switch 30 is placed in the upper position for automatic tracking and for aided tracking, and in the lower position for slewing.

Switch 31 is closed for automatic tracking and for slewing, and is opened for aided tracking (to avoid wasteful loss of energy in turning the range servo). The switch (not shown) for energizing the magnetic clutch 34 is opened for automatic tracking and for slewing, and is closed for aided tracking. The switch (not shown) for magnetic clutch 36 is closed for automatic tracking and for slewing, and is opened for aided tracking.

It is believed that the construction and operation of my improved tracking system will be apparent from the foregoing detailed description thereof. Assuming, for convenience, that the circuit is used for "radar" range tracking, a target may be selected and the apparatus put in the "slew" condition in order to slew the marker close to the target. The apparatus may then be put in the "aided tracking" position, and the target followed by the manual control handle. This not only follows the target, but sets up an approximately correct range rate on the range rate potentiometer. By then shifting the apparatus to "automatic tracking," the marker will follow the target automatically. In practice it is usually possible to switch directly from the slewing condition to the automatic tracking condition, without going through the aided tracking operation. This is so because the maximum speed at which the automatic tracking mechanism will "lock on" the target greatly exceeds the minimum slewing speed. When the system is automatically tracking it may run into trouble by engaging a series of echoes other than the one sought to be tracked, thus making it impossible to automatically track the target, and at such time the apparatus may be shifted to the aided tracking condition, whereupon the marker will automatically coast at the previous range rate. If the observer sees that this coasting is not adequate to follow the target, he may crank in a correction by means of the manual control handle. Although the operator merely operates the handle in such a manner as to keep the marker on the target, during this operation the range rate potentiometer is continuously being reset until the correct rate is established. When the target pip moves to a clear region where it can be automatically tracked, the apparatus can again be put in the automatic tracking condition, and the range gates will again lock on the target.

It will be understood that while I have shown and described my invention in a preferred form, many changes may be made in the circuit and structure shown, without departing from the spirit of the invention, as sought to be defined in the following claims.

I claim:

1. Apparatus comprising a reversible motor responsive to a position error voltage, a measurement potentiometer driven by said motor to provide a measurement potential for shifting a measurement indication in that direction which will reduce the error voltage to zero, a generator driven by said motor to provide a measurement rate potential, a second reversible motor responsive to the measurement rate potential, and a measurement rate potentiometer driven by said second motor for supplying a potential in opposition to the measurement rate potential.

2. Apparatus comprising a reversible motor responsive to a position error voltage, a measurement potentiometer driven by said motor to provide a measurement potential for shifting a measurement indication in that direction which will reduce the error voltage to zero, a generator driven by said motor to provide a measurement rate potential, a second reversible motor responsive to the measurement rate potential, a measurement rate potentiometer driven by said second motor for supplying a potential in opposition to the measurement rate potential, and appropriate switches for disconnecting the first motor from the error voltage source and connecting it to a slew potentiometer when the apparatus is to be used for slewing.

3. Apparatus comprising a reversible motor responsive to a position error voltage, a measurement potentiometer driven by said motor to provide a measurement potential for shifting a measurement indication in that direction which will reduce the error voltage to zero, a generator driven by said motor to provide a measurement rate potential, a second reversible motor responsive to the measurement rate potential, a measurement rate potentiometer driven by said second motor for supplying a potential in opposition to the measurement rate potential, switch means for de-energizing said first reversible motor, first clutch means for disconnecting said measurement rate potentiometer from said second motor, second clutch means for mechanically coupling said second motor to said measurement potentiometer whereby said apparatus may be employed for aided tracking, and a manual control handle connected to the measurement potentiometer and the measurement rate potentiometer for use during aided tracking.

4. Apparatus comprising a reversible motor responsive to a position error voltage, a measurement potentiometer driven by said motor to provide a measurement potential for shifting a measurement indication in that direction which will reduce the error voltage to zero, a generator driven by said motor to provide a measurement rate potential, a second reversible motor responsive to the measurement rate potential, a measurement rate potentiometer driven by said second motor for supplying a potential in opposition to the measurement rate potential, a slew potentiometer, switch means for disconnecting the first motor from the error voltage source and connecting it to said slew potentiometer when the apparatus is to be used for slewing, means permitting said apparatus to be employed for aided tracking, said apparatus comprising switch means for de-energizing said first motor, first clutch means for disconnecting said measurement rate potentiometer from said second motor, and second clutch means for mechanically coupling said second motor to said measurement potentiometer, and a manual control handle connected to the measurement potentiometer and the measurement rate potentiometer for use during aided tracking.

5. Apparatus comprising a reversible motor responsive to a position error voltage, a measurement potentiometer driven by said motor to provide a measurement potential for shifting a measurement indication in that direction which will reduce the error voltage to zero, a generator driven by said motor to provide a measurement rate potential, a second reversible motor responsive to the measurement rate potential, a measurement rate potentiometer driven by said second motor for supplying a potential in opposition to the measurement rate potential, means permitting said apparatus to be employed for slewing, said means comprising, a slew potentiometer, first switch means for disconnecting said first motor from said error voltage source and connecting it to said slew potentiometer, and second switch means for disconnecting said second motor from said measurement rate potential, means permitting said apparatus to be employed for aided tracking, said last-mentioned means comprising, third switch means for deenergizing said first motor, first clutch means for disconnecting said measurement rate potentiometer from said second motor and second clutch means for mechanically coupling said second motor to said measurement potentiometer, a manual control handle connected to the measurement potentiometer and the measurement rate potentiometer for use during aided tracking, and means to stabilize the operation of the first and second motors.

6. Apparatus comprising a bridge modulator amplifier supplied with a position error voltage for controlling the amplitude and phase of A. C., a two phase motor having one field supplied with the output of the bridge modulator amplifier and the other field supplied with reference A. C., a measurement potentiometer driven by said motor to provide a measurement potential for shifting a measurement indication in that direction which will reduce the error voltage to zero, a D. C. tachometer driven by said motor to provide a measurement rate potential, a second bridge modulator amplifier supplied with said measurement rate potential for controlling the amplitude and phase of A. C., a second two phase motor having one field coil supplied with the output of said bridge modulator amplifier and a second field coil supplied with reference A. C., and a measurement rate potentiometer driven by said second motor for supplying a potential in opposition to the measurement rate potential.

7. Apparatus comprising a bridge modulator amplifier supplied with a position error voltage for controlling the amplitude and phase of A. C., a two phase motor having one field supplied with the output of the bridge modulator amplifier and the other field supplied with reference A. C., a measurement potentiometer driven by said motor to provide a measurement potential for shifting a measurement indication in that direction which will reduce the error voltage to zero, a D. C. tachometer driven by said motor to provide a measurement rate potential, a second bridge modulator amplifier supplied with said measurement rate potential for controlling the amplitude and phase of A. C., a second two phase motor having one field coil supplied with the output of said bridge modulator amplifier and a second field coil supplied with reference A. C., a measurement rate potentiometer driven by said second motor for supplying a potential in opposition to the measurement rate potential, a slew potentiometer, switch means for disconnecting the first bridge modulator amplifier from the error voltage source and connecting it to said slew potentiometer when the apparatus is to be used for slewing, means adapting said apparatus for aided tracking, said last-mentioned means comprising, switch means for de-energizing said first motor, first clutch means for disconnecting said measurement rate potentiometer from said second motor and second clutch means for mechanically coupling said second motor to said measurement potentiometer, and a manual control handle connected to the measurement potentiometer and the measurement rate potentiometer for use during aided tracking.

8. Apparatus comprising a reversible motor responsive to a position error voltage, a measurement potentiometer driven by said motor to provide a measurement potential for shifting a measurement indication in that direction which will reduce the error voltage to zero, a D. C. tachometer driven by said motor to provide a measurement rate potential, a second motor responsive to said measurement rate potential, a measurement rate potentiometer driven by said second motor for supplying a potential in opposition to the measurement rate potential, means for degeneratively feeding a part of the D. C. tachometer output to stabilize the operation of the first motor, a second D. C. tachometer driven by the second motor, and means to feed a portion of the second tachometer output in such a direction as to stabilize the operation of the second motor.

9. Apparatus comprising a reversible motor responsive to a position error voltage, a measurement potentiometer driven by said motor to provide a measurement potential for shifting a measurement indication in that direction which will reduce the error voltage to zero, a D. C. tachometer driven by said motor to provide a measurement rate potential, a second motor responsive to said measurement rate potential, a measurement rate potentiometer driven by said second motor for supplying a potential in opposition to the measurement rate potential, a slew potentiometer, switch means for disconnecting the first motor from the error voltage source and connecting it to said slew potentiometer when the apparatus is to be used for slewing, means adapting said apparatus for aided tracking, said last-mentioned means comprising, switch means for de-energizing said first motor, first clutch means for disconnecting said measurement rate potentiometer from said second motor and second clutch means for mechanically coupling said second motor to said measurement potentiometer, a manual control handle connected to the measurement potentiometer and the measurement rate potentiometer for use during aided tracking, means for degeneratively feeding a part of the D. C. tachometer output to stabilize the operation of the first motor, a second D. C. tachometer driven by the second motor, and means to feed a portion of the second tachometer output in such a direction as to stabilize the operation of the second motor.

10. Apparatus comprising a bridge modulator amplifier supplied with a position error voltage for controlling the amplitude and phase of A. C., a two phase motor having one field supplied with the output of the bridge modulator amplifier and the other field supplied with reference A. C., a measurement potentiometer driven by said motor to provide a measurement potential for shifting a measurement indication in that direction which will reduce the error voltage to zero, a D. C. tachometer driven by said motor to provide a measurement rate potential, a second bridge modulator amplifier supplied with said measurement rate potential for controlling the amplitude and phase of A. C., a second two phase motor having one field coil supplied with the output of said bridge modulator amplifier and a second field coil supplied with reference A. C., a measurement rate potentiometer driven by said second motor for supplying a potential in opposition to the measurement rate potential, means for degeneratively feeding a part of the D. C. tachometer output to the first bridge modulator amplifier to stabilize the operation of the first motor, a second D. C. tachometer driven by the second motor, and means to degeneratively feed a portion of the tachometer output to the second bridge modulator amplifier to stabilize the operation of the second mtor.

11. Apparatus comprising a bridge modulator amplifier supplied with a position error voltage for controlling the amplitude and phase of A. C., a two phase motor having one field supplied with the output of the bridge modulator amplifier and the other field supplied with reference A. C., a measurement potentiometer driven by said motor to provide a measurement potential for shifting a measurement indication in that direction which will reduce the error voltage to zero, a D. C. tachometer driven by said motor to provide a measurement rate potential, a second bridge modulator amplifier supplied with said measurement rate potential for controlling the amplitude and phase of A. C., a second two phase motor having one field coil supplied with the output of said bridge modulator amplifier and a second field coil supplied with reference A. C., a measurement rate potentiometer driven by said second motor for supplying a potential in opposition to the measurement rate potential, a slew potentiometer, switch means for disconnecting the first bridge modulator amplifier from the error voltage source and connecting it to said slew potentiometer when the apparatus is to be used for slewing, means adapting said apparatus for aided tracking, said last-mentioned means comprising switch means for de-energizing said first motor, first clutch means for disconnecting said measurement rate potentiometer from said second motor and second clutch means for mechanically coupling said second motor to said measurement potentiometer, a manual control handle connected to the measurement potentiometer and the measurement rate potentiometer for use during aided tracking, means for degeneratively feeding a part of the D. C. tachometer output to the first bridge modulator amplifier to stabilize the operation of the first motor, a second D. C. tachometer driven by the second motor, and means to degeneratively feed a portion of the tachometer output to the second bridge modulator amplifier to stabilize the operation of the second motor.

12. Apparatus comprising a reversible driving means responsive to an error voltage, a variable voltage source coupled to said driving means to provide a measurement potential for shifting a measurement indication in a direction to reduce said error voltage to zero, a second variable voltage source coupled to said driving means to provide a measurement rate potential, a second reversible driving means responsive to the measurement rate potential, and a third variable voltage source coupled to said second driving means for supplying a potential in opposition to the measurement rate potential.

13. Apparatus comprising a first reversible driving means responsive to an error voltage, a variable voltage source coupled to said first driving means to provide a measurement potential for shifting a measurement indication in that direction which will reduce the error voltage to zero, a second variable voltage source coupled to said driving means to provide a measurement rate potential, a second reversible driving means responsive to said measurement rate potential, a third variable voltage source coupled to said second driving means for supplying a potential in opposition to the measurement rate potential, and a slewing voltage source and switch means for disconnecting said first driving means from said error voltage source and coupling it to said slewing voltage source when the apparatus is to be used for slewing.

14. Apparatus comprising a first reversible driving means responsive to an error voltage, a variable voltage source coupled to said first driving means to provide a measurement potential for shifting a measurement indication in that direction which will reduce the error voltage to zero, a second variable voltage source coupled to said driving means to provide a measurement rate potential, a second reversible driving means responsive to said measurement rate potential, a third variable voltage source coupled to said second driving means for supplying a potential in opposition to the measurement rate potential, and means adapting said apparatus for aided tracking, said means comprising, first control means for de-energizing said first driving means, means for disconnecting said third variable voltage source from said second driving means and means for coupling said second driving means to said first variable voltage source and manual control means connected to said first and said third variable voltage sources for use during aided tracking.

ALBERT M. GRASS.

REFERENCES CITED

The following references are of record in the file of this patent:

UNITED STATES PATENTS

| Number | Name | Date |
| --- | --- | --- |
| 2,338,423 | Geyger | Jan. 4, 1944 |
| 2,367,746 | Williams | Jan. 23, 1945 |
| 2,414,430 | Nisbet | Jan. 14, 1947 |